May 5, 1942.  C. P. XENIS  2,282,279
LIMITER LUG
Filed April 8, 1941
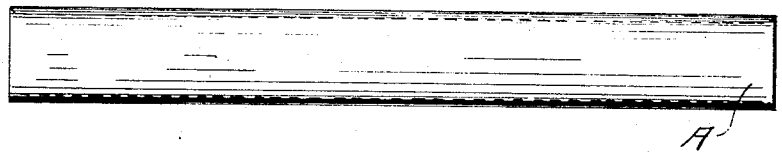
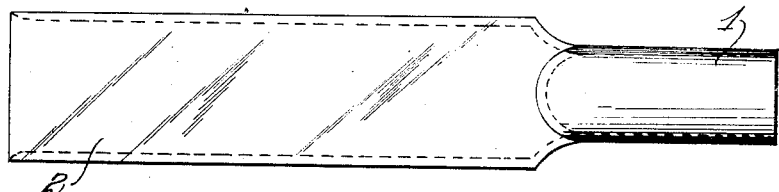
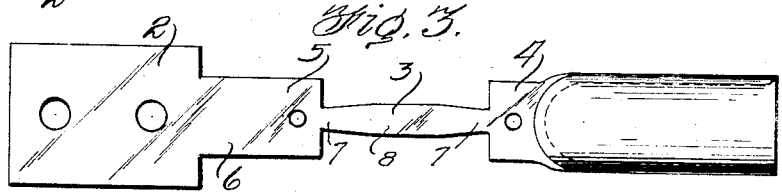
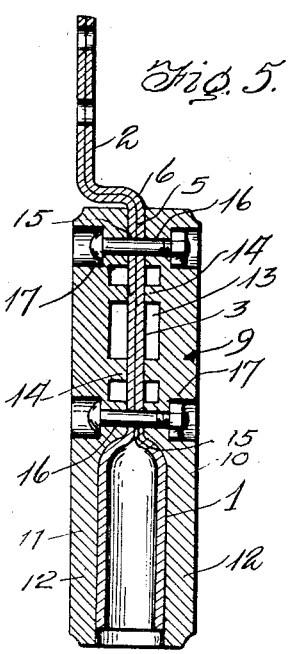
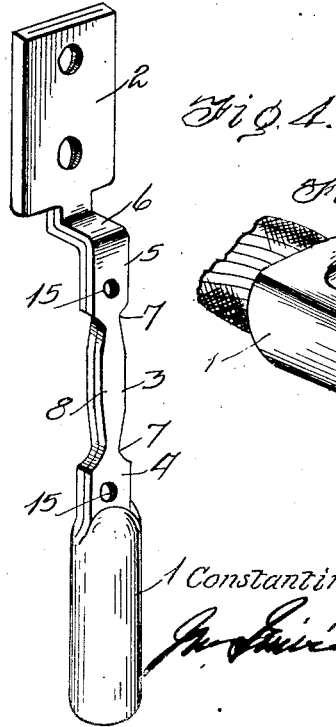
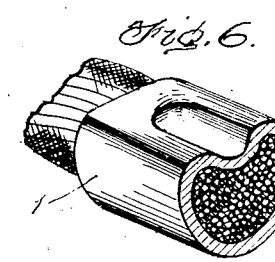
Inventor
Constantine P. Xenis,
Attorney Patented May 5, 1942

2,282,279

UNITED STATES PATENT OFFICE 2,282,279

LIMITER LUG

Constantine P. Xenis, Little Neck, N. Y., assignor to Consolidated Edison Company of New York, Inc., New York, N. Y., a corporation of New York Application April 8, 1941, Serial No. 387,545

11 Claims. (Cl. 200—135)

This invention relates to a limiter which is generally of the type described in my copending application, filed June 6, 1939, Serial No. 277,741, now Patent # 2,259,053, Oct. 14, 1941, but which is designed more particularly for use in protecting the service cable which connects between the electrical power supply system and the bus bar of the power user or the bus of an electrical equipment.

In connection with underground cable systems, a cable or cables are led from this system for service use of the current in a building or other location, and in this use, the terminal of the service cable is connected to a bus bar from which the immediate building service is led. It is recognized that for maximum reliability and safety of operation the incoming cable must be protected against destruction incident to faults in the nature of short circuits and that the protection of the cable and of the bus should, from the standpoint of economy of installation and complete and effective function, be best provided in the nature of a fuse formed and designed to serve as a terminal connector between the cable and bus, with the fuse design predetermined primarily in accordance with the cable damage characteristic previously ascertained by appropriate tests.

As will later appear, it is of maximum importance that the limiter forming the sole element between the cable and bus bar be of integral construction, in order to insure a uniform electrical continuity between the end of the cable and limiter terminal and avoidance of contact surfaces, such as are provided by the conventional types of fuse mountings which surfaces are subject to deterioration through oxidation and loosening and may thus generate varying amounts of heat which are not related to the temperature rise of the cable conductor and which heat would alter the time current characteristic of the fusible element and prove to be a source of maintenance expense.

The present invention, therefore, is directed primarily to an integral limiter formed from a hollow cylindrical or otherwise shaped tubular element, which for a portion of its length less than the whole is appropriately shaped to provide a limiter or fuse section and a terminal end for the connection of the limiter to the bus bar.

That portion of the original element not subjected to this formation is permitted to remain in its original shape to serve as a receiving connector for the end of the incoming cable.

The invention in its preferred form is illustrated in the accompanying drawing.

Figure 1 is a view in elevation of the initial tubular element;

Figure 2 is a plan of the same element following the initial step of formation;

Figure 3 is a plan view of the tube following the third step of formation;

Figure 4 is a perspective view of the limiter lug;

Figure 5 is a vertical sectional view through the lug, showing one of the shell sections in place and the insulating envelope;

Figure 6 is a detail sectional view showing a deformed end of a sleeve supporting a cable end.

The limiter, or more particularly the limiter lug as more definitely defined, is illustrated as constructed of a single integral mass of metal A shaped at one end, as at 1, to provide a hollow terminal connector to receive the cable end, and shaped at the opposite end, as at 2, to provide a terminal bus section of appropriate length, width and thickness to facilitate connecting the terminal lug to a bus bar or like member. Intermediate the bus terminal 2 and the cable connecting section 1, the limiter lug is formed with a limiter or fusing section 3, the particular shape and mass of which is determined by the cable damage characteristic of the connected cable, as will later appear.

The metal of the limiter lug between the limiter or fuse section 3 and the cable connector 1 may present a short length of integral formation 4 forming a supporting connection between the limiter sections and the cable connector, and the opposite end of the limiter lug between the limiter section and the bus 2 may present a connecting section 5 of similar width and thickness to the section 4 but of somewhat greater length than such section 4, the excess length of the section 5 over the section 4 being indicated at 6. The section 5 at its junction with section 6 may be offset or bent, as illustrated, to offset the plate 2 to facilitate the connection to the bus bar or other detail of insulation.

There are two essential characteristics of the limiter lug which are of importance and cannot be disregarded if the limiter lug is to perform its desired function. The first of these characteristics is the particular and peculiar formation of the intermediate or limiter fusing section 3. This section, as shown, is formed at the respective terminals with a relatively narrow width 7, naturally of reduced mass, and intermediate such sections of reduced width with a section 8 of increased width, and therefore, of increased mass.

Having determined by proper tests and experiments the cable damage characteristics of the type cable to be protected by the limiter lug, the details of the parts 7 and 8 are readily provided, and it is through this determination that the actual form of the limiter or fuse section is decided upon.

It may be briefly stated that the damage characteristic of the cable is determined by tests which reveal the time period for which a fault current of a given magnitude may be sustained by the cable without destruction of the insulation of the cable. Many cable faults burn clear; others, so far as heat generated is concerned, may consist of a heavy cable overload, but where either such objectionable condition dissipates or clears itself before reaching a point where the cable insulation is liable to be affected to a point of substantial destruction, it is vitally important from the practical and commercial side of cable installation, that the cable circuit be not interrupted by the blowing of the fuse or limiter, as otherwise service to customers will be impaired and the blown limiters must be replaced. It is important, therefore, that the limiter or fuse section be designed to sustain the heat of the fault current for a predetermined period slightly less than that which experience and tests have demonstrated would result in destruction of the cable insulation. If the cable limiter fuse section be thus designed, the cable can safely carry heavy currents up to a point short of destruction, and on blowing, provides effective notice of cable conditions which may be remedied.

Therefore, fusible section 3 of the improved limiter is designed to provide the protective fuse function which will remain intact for a predetermined time limit under the fault current of the cable, which time limit is slightly short of that required for such fault to destroy the insulation of the cable. By the particular formation of the fuse section of the limiter, it will be noted that the central section 8 has been enlarged with respect to the end sections 7, and that this enlargement is sufficient to overcome the tendency of the temperature at such central section to rise faster than the temperature in the end sections 7. As a consequence, a greater amount of heat must be generated to heat the relatively wider central section 8 and bring it to a melting temperature and supply the heat of fusion than if the fuse were of uniform width or of reduced width in the central portion.

According to the known detail of the cable damage characteristic, it will be apparent that a proper relative formation of the widened portion 8 and relatively narrow end 7 of the limiter fuse section insures that the entire fuse length may be brought more nearly into a state of balance insofar as heat generated and heat conducted is concerned, so that the fuse formation will be heated relatively uniformly by the passage of a high current until it finally fuses, which fusion occurs at the widened central portion 8. This, for the reason that this widened central portion compensates for the conduction of heat from the reduced ends of the fuse section, so that although more heat is conducted away from the reduced ends, more is generated there by reason of its smaller cross section, and the amount of heat generated in the widened portion is just sufficient so the temperature of the central portion will be slightly ahead of the temperature of the reduced end portions. Thus the central portion of the fuse eventually melts, but only after the whole fuse has been heated almost to the melting point. This clearly and unmistakably establishes a time delay in the action of the fuse section over other forms of fuse section, and this time delay may, by appropriate relation of the relatively narrow end and relatively wider central section, be exactly that required for the time delay necessary to protect properly the cable against destruction from a fault current.

The method of forming the limiter lug constitutes a characteristic and important feature of the present invention. In this method, a tubular element A of circular or other form in cross section is subjected to pressure at a point sufficiently remote from one end to leave the cable connecting section 1 intact and unaffected. The remaining portion of the tubular element is subjected to pressure to flatten the same throughout the remaining length of the tube, and then the flattened portion is cut away to provide the particularly formed limiter section 3, the connecting sections 4, 5 and 6, and the latter may be bent to offset the bus 2. Of course, it is quite obvious that the complete formation of the limiter lug may in the method of formation be provided in a single stamping. It is to be particularly noted that in this method the fusing section of the limiter lug 3 is, in any method employed, finally of the shape approaching that illustrated in the drawings with relatively narrow end portions 7 and the intermediate widened portion 8. The relations of these parts will in any method of formation be determined by results of the tests for the cable damage characteristics of the cable to be protected, as previously explained.

It is preferred that in the method, the initial element be a tube of cylindrical form and constructed of copper, with the wall of the tube of such thickness that in the cable connecting section 1, such wall will securely receive and support the cable without presenting sufficient mass to create a thermal reservoir which would disrupt the thermal correlation between the cable and the fusible element of the limiter. That is, with current values in the neighborhood of the minimum required to fuse the limiter element, the time required for fusion is quite sensitive to the temperature of the masses at the ends of the fusible element and any construction which provides a reservoir of heat at the fuse terminals will increase the fusing time of a particular limiter element and result in a limiter time current characteristic which departs more widely from the ideal required to protect completely the cable insulation from fault currents. Of course, it will be apparent that the bus section 2 is of greater mass than the fusing section, with the result that such section 2 will conduct the heat more rapidly than the fusing section as a unit. Thus the heat relied upon for a predetermined fusing of the fuse section, will, incident to the greater mass of the bus section 2, be conducted by such bus section away from the fusing section, and will result in increasing the fusing time of a particular fusing section, thus materially varying the ideal time period required to protect the cable under the predetermined conditions. To avoid this condition, the limiter lug is provided with a section—sections 5 and 6—between the fusing section and the bus 2, which is of greater mass than the section 4, between the fusing section and the cable connector. The mass of the sections 5 and 6, and particularly the section 6, is of such predetermined limit that such sections 5 and 6 will act to compensate for and prevent a too rapid heat conduction from the fusing section by the bus section. Thus the respective ends of the limiter lug beyond the fusing section may be said to be in substantially thermal balance and the fusing section caused to respond in fusing function to the time limit and heat degree for which it is designed with great accuracy.

It is important for practical insulation that the limiter lug throughout its maximum possible length be insulated and protected to avoid danger and possible short circuiting in the event of blowing of the fusing section. To provide for this the limiter lug is enclosed, throughout its permissible length, with an insulating shell 9. This shell has been described at length in the application previously referred to, but has certain definite advantages in use with the limiter lug. The insulating shell is made, preferably in two more or less duplicate sections 10 and 11, of asbestos or other appropriate material, which together present a substantially cylindrical exterior and formed in their inner faces to receive and fit the formation of the limiter lug. Thus, the sections have portions 12 to snugly fit and bear on the cable connector 1, the sections 4 and 5, and recessed at 13 to enclose but avoid contact with the fusing section 3. Such recessed portion 13 is formed with partitions 14 which bear on the respective surface of the fusing section 3 at opposite ends of the widened portion 8 thereof. This provides a closed chamber for the section of the limiter which is ruptured in fusing, and confines the flowing metal and prevents it from reaching the adjacent unmelted portions of the limiter, and thus prevents the possibility of maintaining electrical continuity of the connection.

The important detail of the protective shell in connection with the limiter lug is its use in preventing mechanical rupture of the relative narrow limiter section under the weight of the connected cable. It will, of course, be apparent that the limiter lug and an appreciable length of cable is necessarily suspended when the parts are in use. As some installations may necessitate a considerable length of unsupported cable, which, of course, is heavy, the unsupported weight might have a tendency to mechanically break the relatively narrow fusing section, particularly at the portions of reduced width, as at 7. To assist in overcoming the possible results of this weight strain, the relatively wider sections 4 and 5 of the limiter lug are formed with openings 15, through which, and through registering openings 16 in the shell sections 10 and 11, bolts 17 are passed and tightly secured. Thus any weight strain to which the limiter lug is subjected during installation and when in use, is borne at least in part by the wider sections of the limiter lug and the sections of the shell. The fusing section per se is thus relieved of the burden of the full weight strain, and thus protected, to a considerable degree, against mechanical rupture from this cause.

Of course, so far as the invention is concerned, its scope obviously contemplates the use of any electrically conductive material, and the transverse contour of the original element may be in any form so long as it is hollow.

What is claimed as new is:

1. An integral limiter lug formed of electrically-conductive material, flat at one end to form a bus section, the opposite end of the lug being tubular to provide a cable connector, the intermediate portion of the lug between the bus section and the cable connector being a continuation of the flat formation, one end of said intermediate portion merging into the connector, the sides of the intermediate portion being cut away adjacent the inner ends of the connector and the bus section portions, the intermediate portion for a predetermined length between the bus section and the connector having end portions of relatively narrow width and a portion gradually widening from such portions of narrow width to an intermediate portion of relatively increased width, the said formed intermediate length providing a fuse section.

2. A limiter lug having an intermediate fusing section, a cable connector at one end, a bus section at the opposite end, and sections of increased mass, relative to the fusing section, and between such fusing section and the connector and between such fusing section and the bus section, and a protective shell enclosing the fusing section and the sections of relatively increased mass, and means for securing the shell to the sections of increased mass to utilize such shell and sections of increased mass for absorbing a considerable portion of any weight-strain on the limiter lug to reduce the otherwise effect of such weight strain on the relatively narrow fusing section.

3. A limiter lug having a cable connector at one end, a bus section at the opposite end, and an intermediate fusing section, a protective shell enclosing the cable connector and fusing section, and means for connecting the shell to parts of such limiter lug beyond the ends of the fusing section to utilize the shell as a means for reducing the influence on the fusing section of any weight to which the limiter lug may be subjected in use.

4. A construction as defined in claim 2, wherein the shell is formed with an interior chamber completely enclosing the fusing portion of the fusing section.

5. A limiter lug of integral construction having one end of a form to receive the end of a cable and the opposite end formed to provide a bus section for connection to a bus bar or like structure, the limiter lug having an intermediate section to serve as a fusing section, the lug including a section between the fusing section and the bus section of such mass relative to the fusing section as to prevent the bus section from a too rapid conduction of heat from the fusing section.

6. A limiter lug formed at one end to provide a wholly tubular section to receive the end of a cable, the opposite end of the limiter lug providing a flat bus section, and an intermediate portion of limiter lug presenting a fusing section of relatively narrow ends, and a relatively wide central portion, the limiter lug intermediate the fusing section and bus section having a length and mass to provide a compensating section to prevent heat conductivity from the fusing section to a degree to prevent proper fusing of the fusing section under a predetermined heat degree for a selected time period.

7. A construction as defined in claim 6 wherein the compensating section is offset from the plane of the fusing section and the bus section offset from the plane of the compensating section.

8. A limiter lug of a single metal construction, formed at one end to receive the end of a cable, and formed at the opposite end to provide a bus section for connection to a bus bar or like structure, the section of the lug intermediate the respective ends being formed as a fusing section.

9. A limiter lug of a single metal construction, formed at one end to provide a hollow tubular section to receive the end of a cable, the opposite end of the limiter lug being in the form of a flat bus section to provide for the connection of the lug to a bus bar or the like, the intermediate portion of the limiter lug presenting a fusing section of relatively narrow ends and a relatively wide central portion.

10. A construction as defined in claim 8, wherein the bus section of the limiter lug is offset from the plane of the central portion thereof.

11. A construction as defined in claim 9, wherein the full limiter lug is an uninterrupted integral copper element.

CONSTANTINE P. XENIS.